April 6, 1954

E. J. BOUDREAUX 2,674,380

SUGAR CANE PILER

Filed May 9, 1950

INVENTOR:

Edwin J. Boudreaux,

BY Cushman, Darby & Cushman

ATTORNEYS.

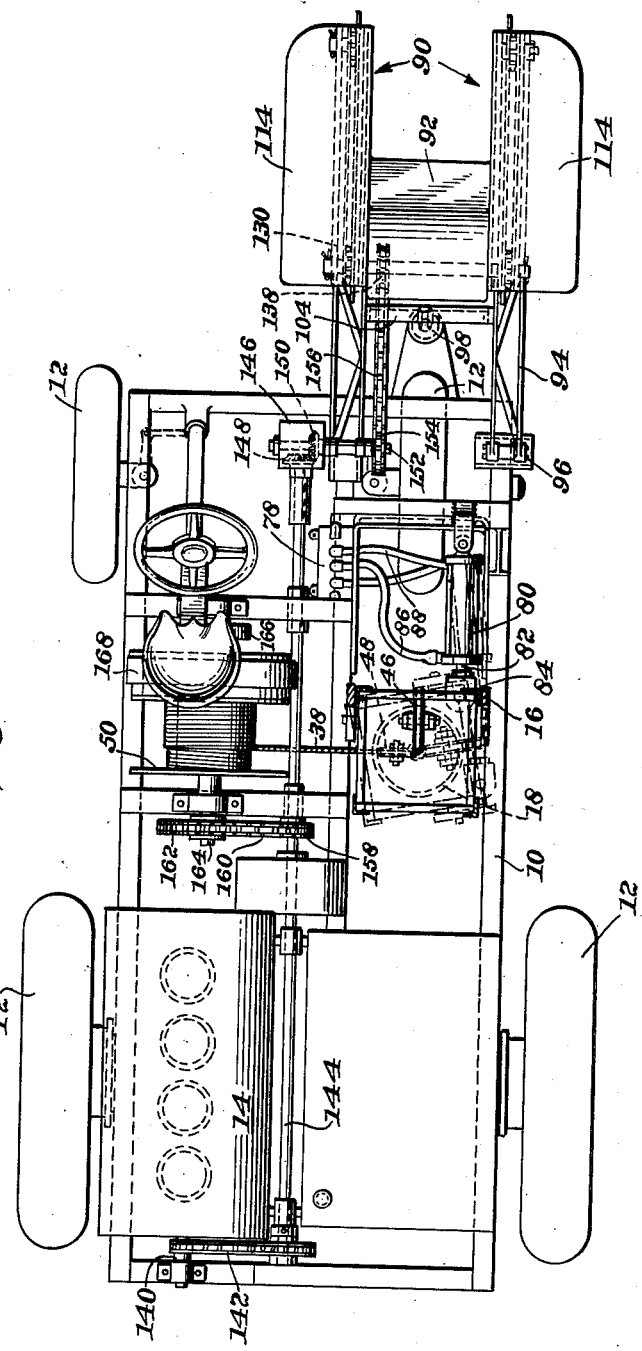

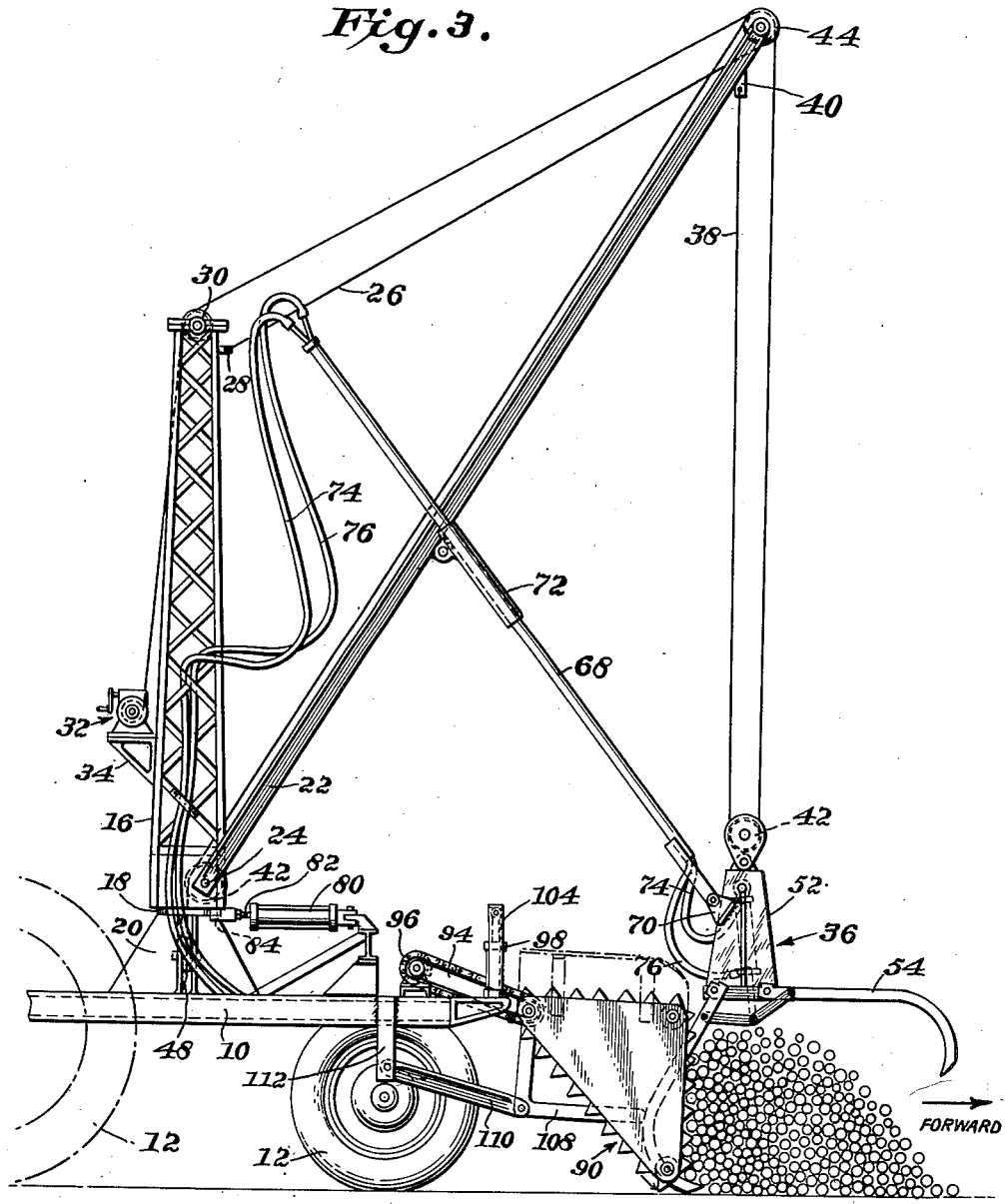

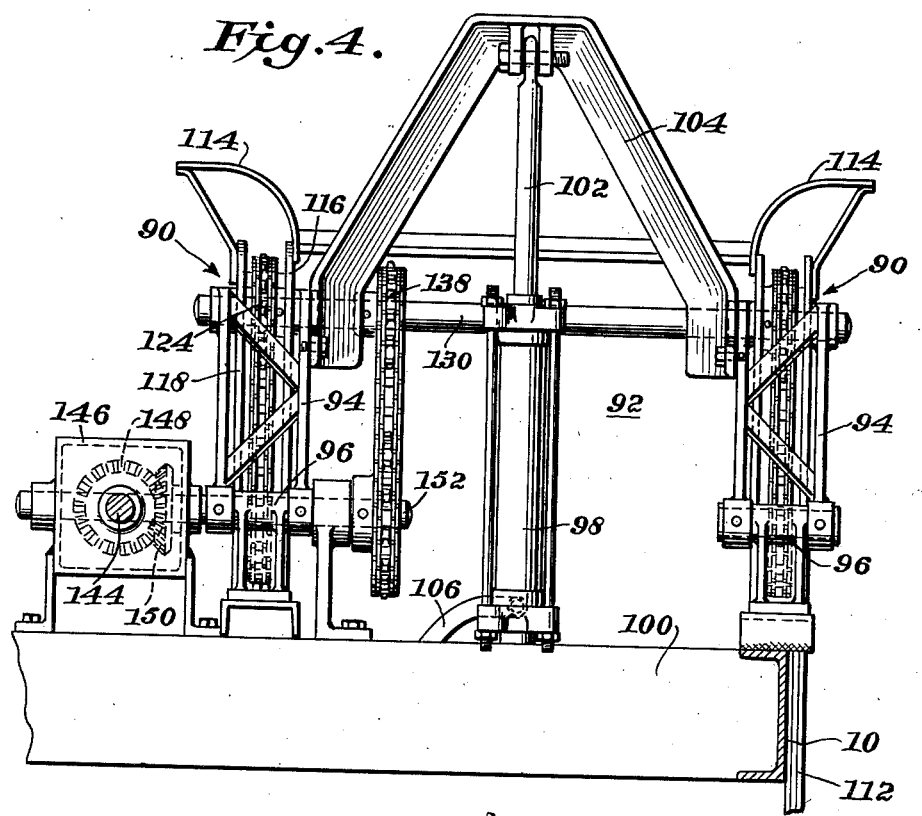
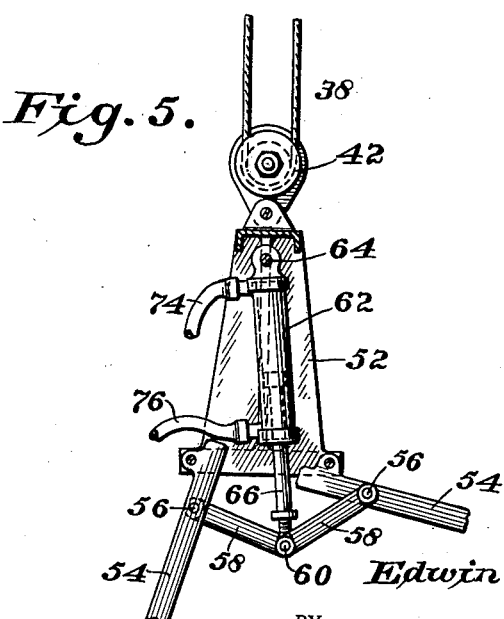

April 6, 1954     E. J. BOUDREAUX     2,674,380
SUGAR CANE PILER
Filed May 9, 1950                                            7 Sheets-Sheet 6
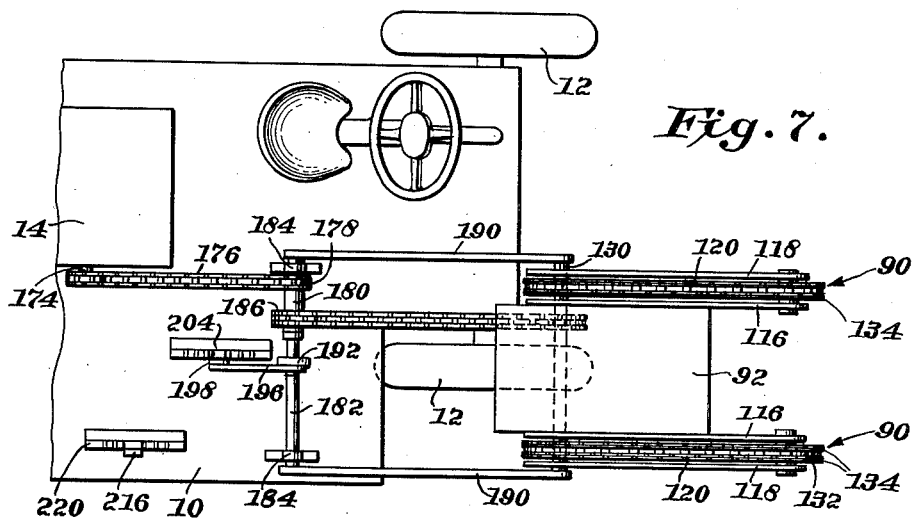
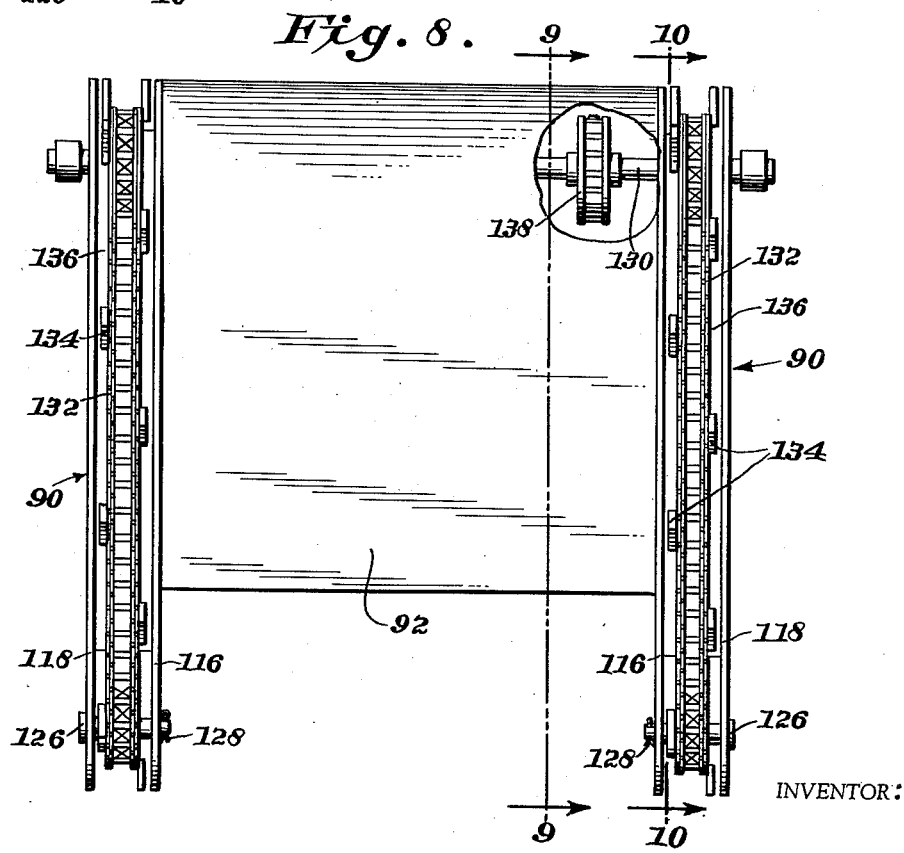
INVENTOR:
Edwin J. Boudreaux,
BY Cushman, Darby & Cushman
ATTORNEYS.

April 6, 1954  E. J. BOUDREAUX  2,674,380
SUGAR CANE PILER
Filed May 9, 1950  7 Sheets-Sheet 7
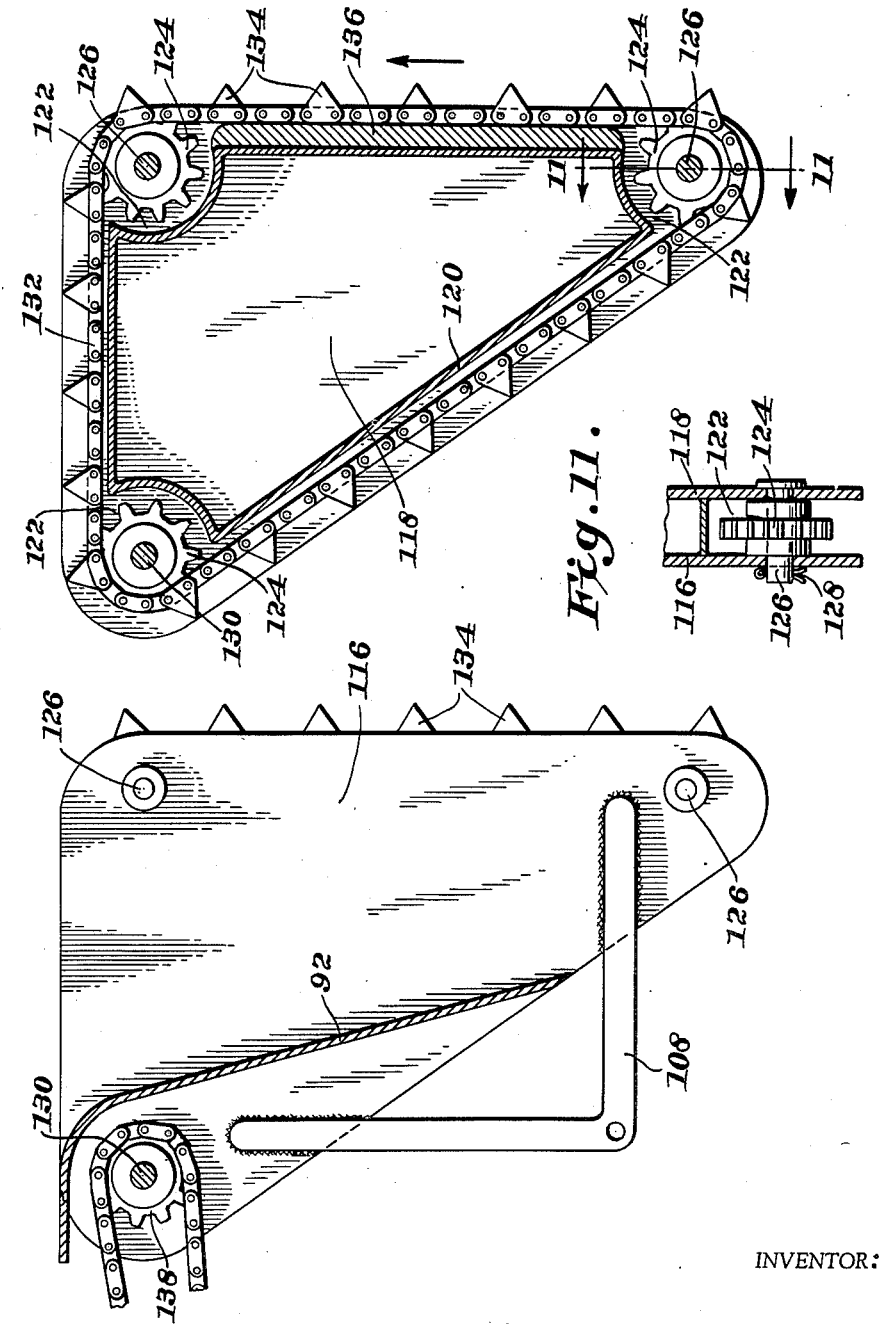
INVENTOR:
Edwin J. Boudreaux,
BY Cushman, Darby & Cushman
ATTORNEYS.

Patented Apr. 6, 1954

2,674,380

UNITED STATES PATENT OFFICE 2,674,380

SUGAR CANE PILER

Edwin J. Boudreaux, New Iberia, La.

Application May 9, 1950, Serial No. 160,995

11 Claims. (Cl. 214—9)

This invention relates to sugar cane loading machines, and particularly to piling mechanism adapted for use therewith. Sugar cane being a dense and heavy crop, considerable work is involved in lifting the cut cane onto a wagon or other conveyance for removal to the mill. The machine of this invention is designed to move along a row of cut cane and pile the cane before it, and periodically grasp the piled cane, hoist it, swing it laterally, and release it onto a conveyance alongside. Machine piling of cut cane, it will be recognized, is apt to dirty the crop, and cause dirt and trash to be gathered into the piles along with the cane, whereby it is less acceptable to the mills and commands a much lower price than does a clean crop.

It is a primary object of the present invention, accordingly, to provide a cane piler adapted to pile cut cane with a lifting, rolling movement, whereby the cane is not dirtied by contact with the ground, and dust, trash and the like are shaken and sifted out of the cane as a pile is formed.

Another object of the invention is to provide improved cane piling means adapted for use with conventional sugar cane loaders.

A further object is to provide a cane loading machine including a cane piler readily elevated relative to the ground. Another object is to provide a cane loading machine including a cane piler adapted to be adjustably tilted relative to the ground.

Still another object is to provide novel grapple mechanism for cane loading machines, particularly adapted to function effectively under all conditions in cooperation with the cane piler of the invention.

Further objects will be in part obvious and in part pointed out hereinafter.

The invention and the novel features thereof may best be made clear from the following description and the accompanying drawings, in which:

Figure 2 is a sectional plan view of the machine of Figure 1, taken substantially on the line 2—2 thereof;

Figure 3 is a side elevational view corresponding generally to Figure 1, with parts omitted for the sake of clarity, and showing the cane piler and grapple in cane engaging position;

Figure 4 is a sectional elevational view taken substantially on the line 4—4 of Figure 1, showing details of the cane piler and the elevating means therefor;

Figure 5 is an enlarged, sectional elevational view of the machine grapple, showing details of its construction;

Figure 7 is a plan view of the modification shown in Figure 6;

Figure 8 is a front elevational view of the cane piler, partially broken away to show the drive therefor;

Figure 9 is a sectional view taken substantially on the line 9—9 of Figure 8;

Figure 10 is a sectional view taken substantially on the line 10—10 of Figure 8, showing details of the piler conveyor, and Figure 11 is a sectional view taken substantially on the line 11—11 of Figure 10.

Figure 1:
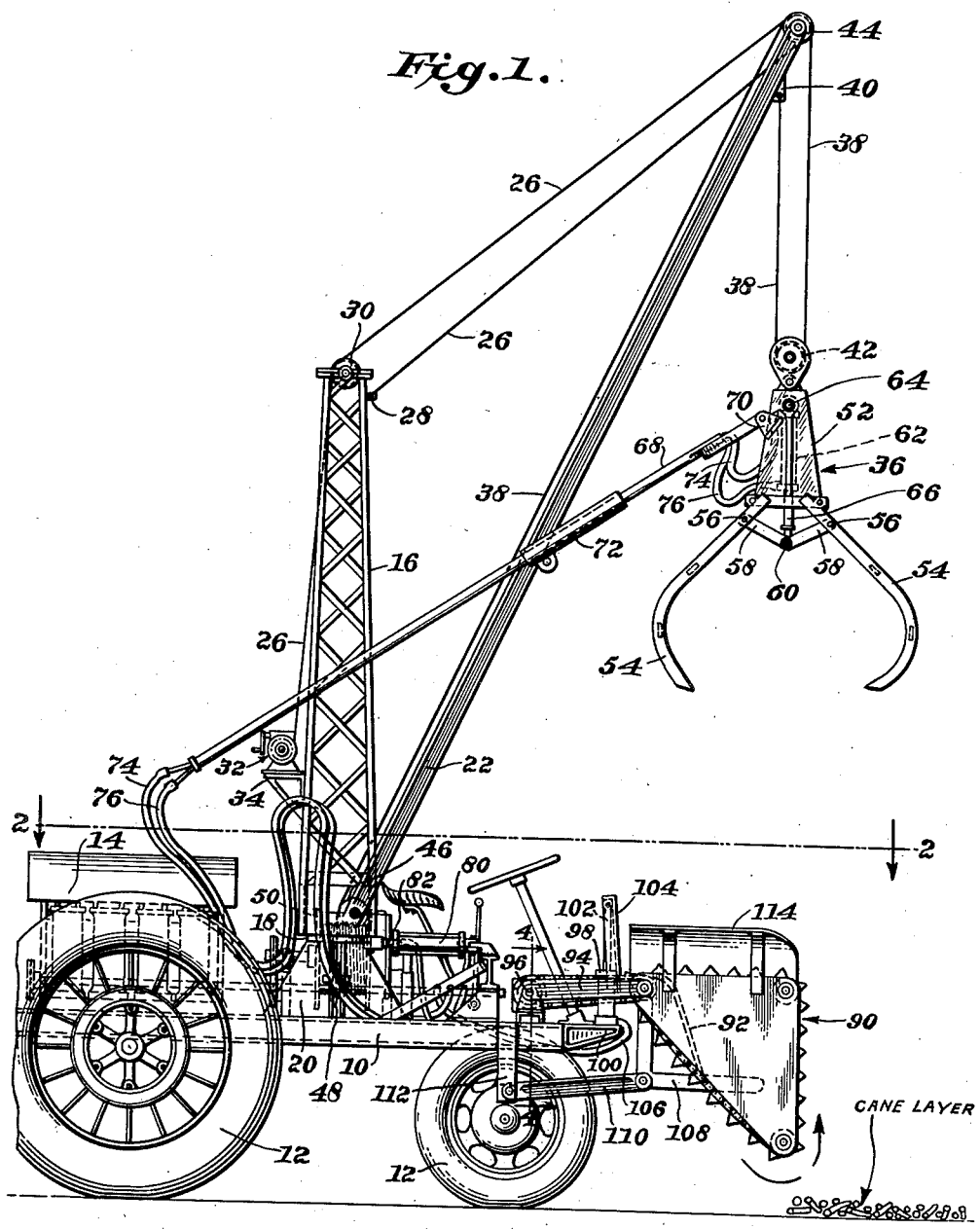
Figure 1 is a side elevational view of a preferred embodiment of the present invention.

Referring to the drawings, particularly Figure 1, the loading machine comprises a frame 10 supported by wheels 12, and adapted to be propelled in conventional manner by power plant 14. Above the frame a vertical mast 16 is provided, mounted in axially rotatable fashion on a bearing 18, supported by a standard 20 built up on the frame. Suitable guys (not shown) may be provided to steady the upper end of the mast.

A rigid boom 22 is pivotally engaged to the lower end of the mast, as by pivots 24. The angularity of the boom relative to the mast is controlled by a line or cable 26, extending from lug 28 near the top of the mast about a pulley at the outer end of the boom, and thence about the pulley 30 mounted at the top of the mast to a hand winch 32, suitably mounted alongside the mast as on bracket 34. Winch 32 may obviously be power operated, if desired.

A grapple indicated generally as 36 is suspended below the outer end of the boom by means of cable 38, which extends from boom lug 40 about the grapple pulley 42 to pulley 44 at the outer end of the boom, and thence along the boom to pulleys 46 and 48 adjacent the lower end thereof and to the cable winding drum 50, suitably mounted on the frame. The grapple, as shown in Figures 1 and 5, comprises a grapple head 52, to the bottom corners of which opposed tongs 54 are individually pivoted. Pivotally engaged to each tong by a pivot 56 located adjacent the point of tong attachment to the grapple head is a link 58, and the other ends of links 58 are engaged to a common pivot 60. Common pivot 60 is connected to the grapple head 52 by extensible means such as hydraulic cylinder 62, one end of which is pivotally engaged to the grapple head by pin 64, the outer end of the cylinder piston rod 66 being pivotally engaged to pivot 60.

A rigid aligning rod 68 is pivotally engaged to grapple lug 70, and is slidably retained by a guide sleeve 72 pivotally mounted on the boom. The aligning rod functions, as will be readily understood, to maintain the grapple in proper alignment with the boom at all times, and may be tubular and house the flexible oil lines 74 and 76 leading from a conventional multiple control valve 78 to the grapple cylinder 62.

As previously stated, mast 16 is axially rotatable on bearing 18, and means are provided for swinging the mast, boom and grapple from a position in general longitudinal alignment with the loading machine to a position substantially transverse thereof, for the purpose of depositing the cut cane onto a suitable conveyance alongside. For this purpose, a hydraulic cylinder 80 may be conveniently employed, one end of cylinder 80 being pivotally engaged to a portion of the machine frame, and the outer end of its piston rod 82 being pivotally engaged to the mast structure at a point offset from its rotational axis, as by pin 84. Extension of piston rod 82, it will be readily seen, will effect rotation of mast 16 from the position shown in solid lines in Figure 2 to the position indicated in dotted lines in that figure, whereby the mast, boom and grapple will be caused to swing approximately 90°, and retraction of piston rod 82 will effect return of the mechanism to longitudinal alignment. Pressure oil may be supplied to cylinder 80 from valve 78 through flexible lines 86 and 88.

The cane piler of the present invention is desirably mounted at an end of the loading machine, preferably the front, in substantial alignment with one of the wheels 12, so that as the wheel travels between the cane rows the piler may engage cut cane normally lying across the tops of the rows. As shown in Figure 2, the cane piler comprises transversely spaced piling elements indicated generally as 90, separated by a downwardly and forwardly inclined guide plate 92 disposed therebetween, the guide plate being substantially spaced from the forward and lower edges of the piling elements, for reasons presently apparent.

The cane piler is mounted for vertical movement relative to the machine frame, being pivotally supported in this embodiment by the outer ends of arms 94, the inner ends of which are pivotally mounted in bearings 96 suitably supported on the frame. Intermediate the length of arms 94, a hydraulic cylinder 98 is vertically mounted on frame beam 100 (see Figure 4), its piston rod 102 extending thereabove and engaging at its outer end the cross member 104, extending between and suitably secured to the arms. Line 106 conveys pressure oil from valve 78 to the cylinder 98. Extension of piston rod 102, it will be seen, effects elevation of the cane piler assembly relative to the loading machine frame, whereby the piler may be adjusted vertically to compensate for unevenness in the terrain, and may be lifted out of the way at the end of a row or when otherwise required. To stabilize the piler throughout its range of elevation, angulated rods 108 are affixed thereto and extend rearwardly therefrom, the corners of the rods being pivotally engaged to rigid links 110, the other ends of which are similarly engaged to downwardly extending frame members 112. In this manner, the piler is supported at several points by a parallelogram linkage, and maintains its relative disposition throughout its range of elevation.

The piling elements 90 may be provided with downwardly and inwardly sloping guide plates 114 extending above their upper edges, to assist in guiding the grapple tongs therebetween. The piling elements comprise, essentially, forward edges disposed generally vertically, and a plurality of cane engaging members extending beyond the forward edges and adapted to be elevated relative thereto, to pile the cane in the desired manner as the loading machine moves along a row.

The piling elements may be constructed as illustrated in Figures 8, 9, 10 and 11, wherein it will be seen that each comprises an inner guard plate 116 and an outer guard plate 118, substantially triangular in shape, spaced and joined by a spacer member 120. At the corners thereof, spacer member 120 is provided with arcuate recesses 122, which form, with the guard plates, housings for sprockets 124. The two forward sprockets are merely idlers, and are rotatably mounted on headed stub shafts 126, extending through the inner and outer guard plates and suitably retained as by cotter pins 128 (see Figure 11). The remaining sprocket 124, disposed within the rearward recess 122, is fixedly mounted on drive shaft 130, which extends between and through both piling elements.

Entrained about the sprockets, in the exemplary embodiment, is a conveyor in the form of endless chain 132, which carries a plurality of suitably spaced and staggered cane engaging fingers 134 affixed thereto and extending outwardly therefrom. The upper and after edges of the guard plates protrude sufficiently relative to the chain so that the fingers 134 disposed in these portions of the piler elements do not extend therebeyond. The forward vertical flight of the conveyor, however, is so disposed relative to the guard plates that the fingers on this portion of the chain protrude therebeyond, and a block 136 may be provided between this portion of the conveyor and spacer member 120 to serve as a backing member and guide for the chain.

As shown in Figure 9, the angulated rods 108 may conveniently be welded to the inside surface of inner guard plates 116. The chains of both piling elements may be driven by means of sprocket 138 fixed to the common drive shaft 130 (see Figure 8), the sprocket 138 being engaged to a source of motive power, preferably a power take-off from power plant 14.

As shown in Figure 2, power may be transmitted from power take-off 140 of power plant 14 by means of suitable sprockets and chains 142 to the longitudinal power shaft 144, the forward end of which enters gear box 146 and by means of bevel gears 148 and 150 drives shaft 152, one end of which is engaged by means of sprocket 154 and chain 156 to sprocket 138 of the piler drive shaft 130. Conventional clutch means (not shown) may be incorporated in the drive system at any convenient point. By means of a sprocket 158 fixed to power shaft 144 intermediate its length, power may also be supplied through chain 160 to sprocket 162 of shaft 164, adapted to drive the cable winding drum 50 through its clutch 166. A conventional brake 168 may also be provided to control the operation of the cable winding drum.

The operation of the device will now be described in detail. The cane rows having been cut and allowed to fall across rows in the usual manner, the loading machine may be driven along the rows, with the wheel 12 adjacent the cane piler guided between adjacent rows, and the piler element chains driven from the power take-off 140 through the drive system described above, to cause the forward flight of the chains and the fingers 134 carried thereby to move upwardly at a fixed rate. As the piling elements advance into the cane, accordingly, the rising fingers protruding from the forward edges thereof will engage the cane stalks and project them upwardly. The combined upward and forward movement of the cane piler, then, imparts a lifting and rolling movement to the cane, each stalk as engaged being lifted out of contact with the ground and knocked onto the tops of the stalks in advance thereof. The action of the cane piler is effective to pile the crop with an absolute minimum of ground contact. Furthermore, the action of the fingers in striking the stalks from below and projecting them upwardly and outwardly is adequate to loosen dirt therefrom, and dust, trash and the like are sifted out of the cane as it is piled. The spaced piling elements are also effective, obviously, to align the stalks in parallelism in the pile.

When a cane pile of sufficient size has been formed, forward movement of the loading machine may be stopped, and the grapple lowered between the piling elements by release of the cable winding drum. As will be evident, the downwardly and inwardly sloping guide plates 114 atop the piling elements and the downwardly and forwardly sloping guide plate 92 therebetween function to properly position the rear tong or tongs of the grapple with respect to the piler mechanism, and thereby to properly position the grapple tongs over the cane pile. When the grapple has been lowered into position, the tongs 54 are closed by actuation of cylinder 62 to extend its piston rod 66, whereby the links 58 effect angular convergence of the tongs, engaging the cane pile therebetween. The loaded grapple may then be raised by operation of the cable winding drum 50, and the mast, boom and grapple swung outwardly of the loading machine by extension of piston rod 82 of hydraulic cylinder 80, as previously described, whereby the loaded grapple may be positioned over a truck or other conveyance travelling alongside the loading machine. When so positioned, the grapple may be opened by retracting operation of its hydraulic cylinder, and the cane dropped onto the conveyance. The mast, boom and grapple may then be returned to normal longitudinally aligned position by reverse operation of pneumatic cylinder 80, in readiness to engage, pick up and load the next pile. Forward movement of the loading machine may be begun as soon as the grapple and engaged cane pile have cleared the piler mechanism, and the piling, engaging, lifting, swinging and dropping cycle is then repeated.

As previously indicated, the guide plates, particularly plate 92, insure proper positioning of the rear tong of the grapple, so that the tongs are properly and positively positioned relative to the pile. The spacing of guide plate 92 from the forward and lower edges of the piling elements permits the rear grapple tong to enter between the piling elements merely far enough so that its point will engage the ground immediately to the rear of the cane pile. The construction of the grapple, particularly the individual pivotal mounting of the tongs and the pivotal connection of the hydraulic cylinder to the grapple head and to the tongs, permits the tongs to function substantially individually, so that positive grappling action is attained under all conditions, even though one or the other of the tongs accidentally hangs up. Functioning of the grapple in this manner, it will be evident, is especially desirable in cooperation with the piler of the invention, and in the engagement of material such as cut cane.

Figure 6:
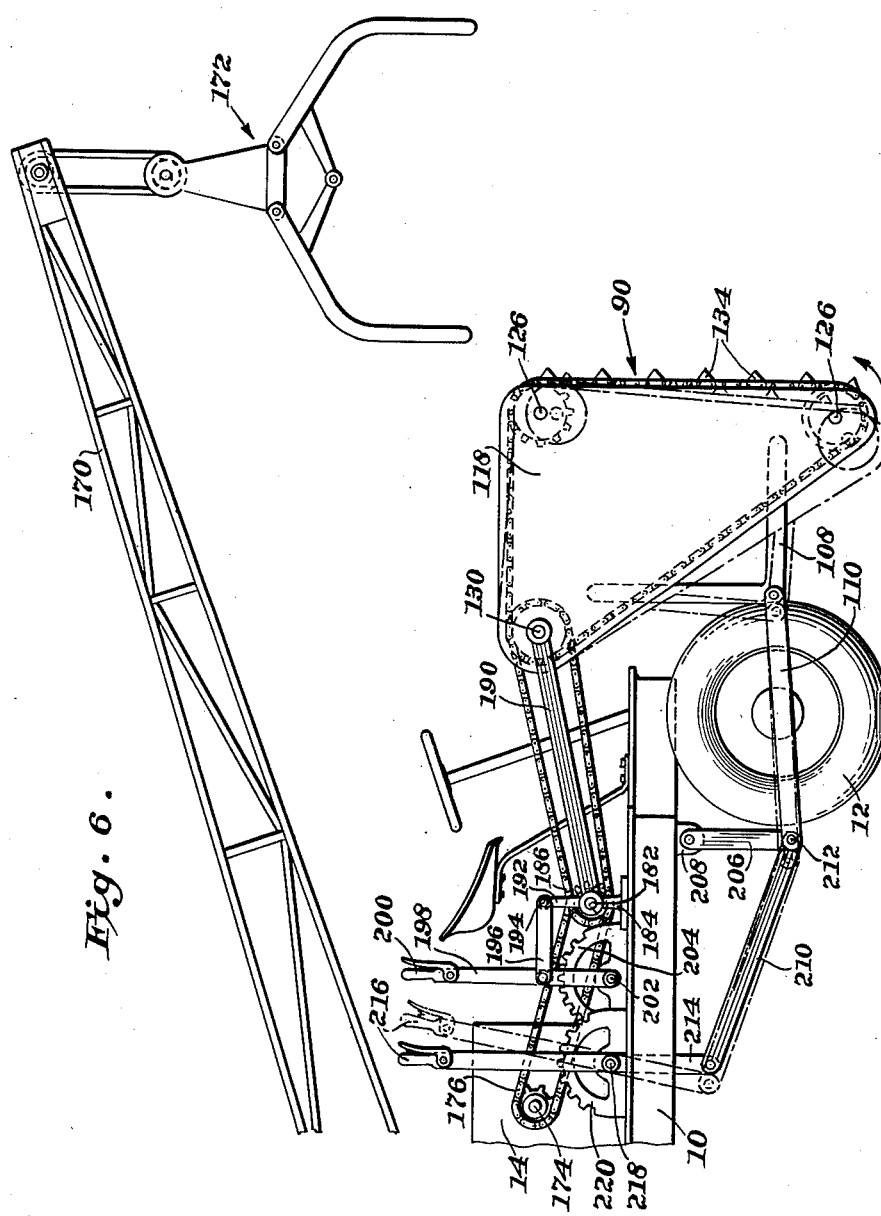
Figure 6 is a side elevational view of a simplified modification of the invention, including means for adjustably tilting the cane piler.

A simplified embodiment of the invention, including means for adjustably tilting the piling elements, is illustrated in Figures 6 and 7. As there shown, the cane piler is mounted on the frame 10 of a conventional sugar cane loader, provided with a conventional boom 170 and grapple 172. As before, the cane piler is mounted at the front of the loading machine, astride the path of one of the front wheels 12 thereof.

In this embodiment, the loading machine power plant 14 is provided with a side power take-off 174, and the piling element drive shaft 130 is driven therefrom by means of chain 176, engaged to sprocket 178 fixed to driving sleeve 180, which is rotatably mounted upon the rock shaft 182, suitably supported above the machine frame, as in bearings 184. Driving sleeve 180 mounts also the sprocket 186, which is connected in driving relationship to sprocket 138 of drive shaft 130 by chain 188.

Manually operated means are provided in this modification to elevate and lower the cane piler. As best shown in Figure 6, the drive shaft 130 of the cane piling elements is rotatably mounted in the outer ends of arms 190, the inner ends of which are fixed to rock shaft 182. Intermediate the length of rock shaft 182, an upstanding short link 192 is affixed thereto, to which is pivoted, as at 194, a rearwardly extending link 196, which is pivotally connected at its free end to an upstanding lever 198. The lever 198 has a handle 200 at its upper end, and at its lower end is pivoted as at 202 to a conventional gear segment 204. It will be readily understood that arcuate shifting of lever 198 will effect rotation of rock shaft 182, and thereby raise or lower the cane piler relative to the loading machine. To stabilize the piler throughout its range of elevation, angulated rods 108 are affixed thereto in the manner previously described, the corners of the rods being pivotally engaged to rigid links 110, the other ends of which are engaged, in this modification, to the outer ends of the downwardly extending links 206, the upper ends of which are pivotally engaged to the machine frame as at 208. This structure, it will be recognized, is substantially equivalent to the parallelogram linkage employed in the modification previously described.

Under some conditions, depending on crop density, moisture content and other factors, it has been found that the operation of the cane piler mechanism may be improved by varying the disposition of the forward edges thereof relative to the vertical through a short range. Accordingly, in the present modification, manually operated means for tilting the cane piler and varying the disposition of the forward edges thereof relative to the vertical is also provided. To effect this adjustment, a rearwardly extending link 210 is pivotally engaged to the pivot 212 joining links 110 and 206, the other end of the link 210 being pivoted to a lever 214 having a handle 216 at its upper end, the lever 214 being pivoted intermediate its ends as at 218 to the conventional gear segment 220. Arcuate movement of the lever 214, for example to the dotted line position shown in Figure 6, will effect corresponding movement of the linkage and tilt the cane piler about the axis of drive shaft 130 to the dotted line position shown in the same figure. In this manner, the disposition of the forward edges of the cane piler may be adjusted as required to effect optimum operation under varying conditions.

This application is a continuation-in-part of application Serial No. 78,805, filed February 28, 1949, and now abandoned.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. In a sugar cane loading machine having means for advancing the machine along a row of cut cane, a cane piler comprising transversely spaced piling elements, the forward edges of said piling elements being disposed generally vertically and in position to push the cut cane to accumulate same in a pile in front of said piling elements, cane engaging members extending outwardly from the forward edges of said piling elements, and means for continuously elevating said cane engaging members upwardly relative to said piling elements to elevate the cane in engagement with the cane-engaging members to impart a rolling action to the pile as the pile accumulates.

2. In a sugar cane loading machine having means for advancing the machine along a row of cut cane, a cane piler comprising transversely spaced piling elements, the forward edges of said piling elements being disposed generally vertically and in position to push the cut cane to accumulate same in a pile in front of said piling elements, a downwardly and forwardly inclined guide plate disposed between said piling elements and spaced from the forward edges thereof to guide the prongs of a grapple thereover, cane engaging members extending outwardly from the forward edges of said piling elements, and means for continuously elevating said cane engaging members upwardly relative to said piling elements to elevate the cane in engagement with the cane-engaging members to impart a rolling action to the pile as the pile accumulates.

3. In a sugar cane loading machine having means for advancing the machine along a row of cut cane, a cane piler comprising transversely spaced piling elements, the forward edges of said piling elements being disposed generally vertically and in position to push the cut cane to accumulate same in a pile in front of said piling elements, a downwardly and inwardly inclined guide plate secured to the upper edge of each of said piling elements, and a downwardly and forwardly inclined guide plate disposed between said piling elements and spaced from the forward edges thereof to guide the prongs of a grapple thereover, cane engaging members extending outwardly from the forward edges of said piling elements, and means for continuously elevating said cane engaging members upwardly relative to said piling elements to elevate the cane in engagement with the cane-engaging members to impart a rolling action to the pile as the pile accumulates.

4. In a sugar cane loading machine having means for advancing the machine along a row of cut cane, a cane piler comprising transversely spaced piling elements, the forward edges of said piling elements being disposed generally vertically and in position to push the cut cane to accumulate same in a pile in front of said piling elements, cane engaging members extending outwardly from the forward edges of said piling elements, means for continuously elevating said cane engaging members upwardly relative to said piling elements to elevate the cane in engagement with the cane-engaging members to impart a rolling action to the pile as the pile accumulates, and means for elevating said piling elements relative to said loading machine.

5. In a sugar cane loading machine having means for advancing the machine along a row of cut cane, a frame, an arm pivotally mounted on said frame and extending forwardly therefrom, a cane piler comprising transversely spaced piling elements pivotally mounted on the forward end of said arm, the forward edges of said piling elements being disposed generally vertically and in position to push the cut cane to accumulate same in a pile in front of said piling elements, cane engaging members extending outwardly from the forward edges of said piling elements, means for continuously elevating said cane engaging members upwardly relative to said piling elements, means operative on said arm for elevating said piling elements relative to said frame, and means pivotally connected to said frame for maintaining the vertical disposition of said piling elements throughout the range of elevation thereof.

6. A machine as in claim 1 wherein each piling element has chain means thereabout on which said cane engaging members are mounted.

7. A machine as in claim 6 wherein the means for elevating the cane engaging members comprises means for driving said chain means about said elements.

8. A machine as in claim 7 wherein each of said piling elements comprises an inner and outer vertical guard plate, said plates being triangular in shape, sprockets positioned at the corners of and between said inner and outer plates of each piling element, said chain means being entrained in said sprockets, and said cane engaging members extending beyond the edges of said inner and outer plates.

9. A machine as in claim 8 and further including spacer means between the spaced apart inner plates of the respective elements for permitting the reception of tongs of a grapple between said inner plates.

10. A machine as in claim 1 and further including means for tilting the piling elements about a horizontal axis.

11. A machine as in claim 4 and further including means for tilting the piling elements about a horizontal axis.

References Cited in the file of this patent

UNITED STATES PATENTS

| Number | Name | Date |
|---|---|---|
| 759,190 | Pope | May 3, 1904 |
| 1,342,463 | Sanwo | June 8, 1920 |
| 1,441,249 | Smith | Jan. 9, 1923 |
| 1,462,787 | Degendorfer | July 24, 1923 |
| 1,595,709 | Coburn | Aug. 10, 1926 |
| 2,355,213 | Flanagan | Aug. 8, 1944 |
| 2,375,205 | Barras | May 8, 1945 |
| 2,403,346 | Deiters | July 2, 1946 |